United States Patent [19]

Yang

[11] Patent Number: 4,497,060

[45] Date of Patent: Jan. 29, 1985

[54] SELF-CLOCKING BINARY RECEIVER

[75] Inventor: John P. Yang, Belle Mead, N.J.

[73] Assignee: Lockheed Electronics Co., Inc., Plainfield, N.J.

[21] Appl. No.: 447,956

[22] Filed: Dec. 8, 1982

[51] Int. Cl.³ .............................................. H04L 7/06
[52] U.S. Cl. ...................................... 375/22; 329/106; 375/110; 375/113
[58] Field of Search ................... 375/22, 49, 110, 113; 307/231, 234, 265, 269; 360/43, 44, 51; 329/106

[56] References Cited

U.S. PATENT DOCUMENTS

| | | | |
|---|---|---|---|
| 3,281,806 | 10/1966 | Lawrance et al. | 329/106 |
| 3,510,780 | 5/1970 | Buehrle | 375/22 |
| 3,949,199 | 4/1976 | Odom | 329/106 |

Primary Examiner—Benedict V. Safourek
Attorney, Agent, or Firm—Hopgood, Calimafde, Kalil, Blaustein & Judlowe

[57] ABSTRACT

Binary data is transmitted as signals of two different pulsewidths to respectively represent logic "0" and "1". At the data receiver, the ratio of the pulsewidths is converted into a corresponding voltage ratio, which, in turn, is applied through a voltage divider to develop clock- and data-control signals at two different levels. Switching devices are respectively actuated whenever the clock- and data-control signals reach preset voltage levels to respectively produce self-synchronized clock and data pulses corresponding to the received binary data.

10 Claims, 15 Drawing Figures

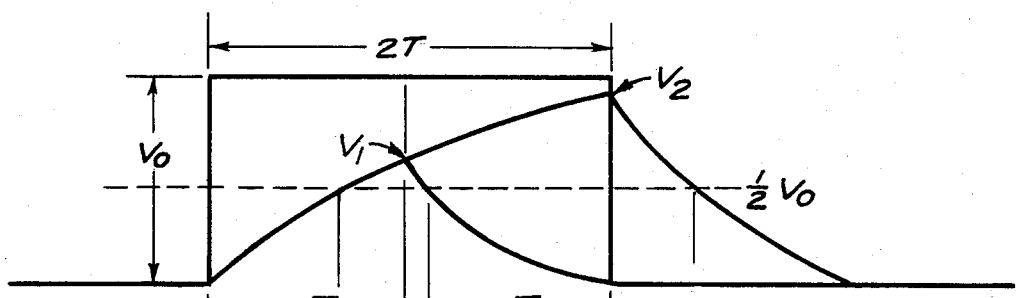
FIG. 4a
FIG. 4b
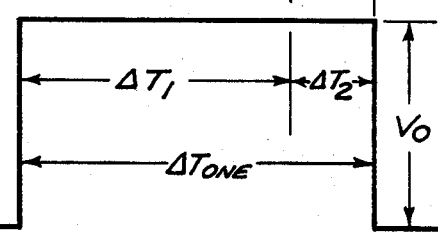
FIG. 4c
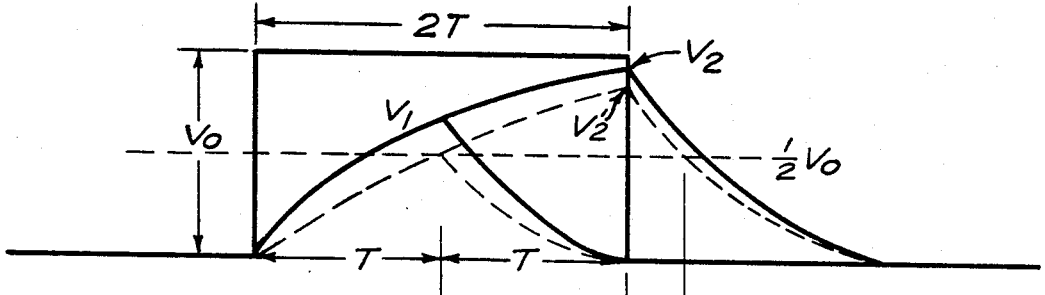
FIG. 5a
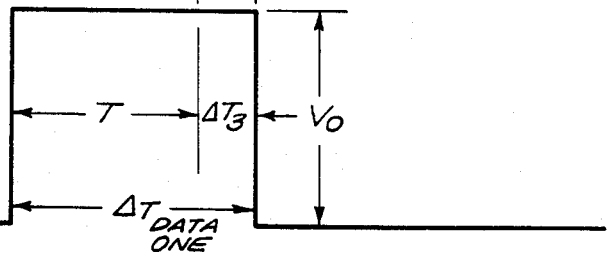
FIG. 5b 4,497,060

SELF-CLOCKING BINARY RECEIVER

The present invention relates generally to binary data communications, and more particularly to a binary data receiver capable of developing clock synchronizing signals from a received binary data signal.

Binary signal transmission is employed in a wide variety of applications such as in communication links between two digital computers, in radar systems, and in other data and communication systems. In a binary data system, the data is in the form of logic "1" and logic "0" signals, which are usually respectively represented by the presence or absence of a voltage or a pulse.

Clock or synchronizing pulses in the data receiver and processor control the various logic operations performed in processing the received data. In some data communication systems, the clock pulses may be transmitted to the data receiver along with the data pulses and separated at the receiver to develop the clock pulses. It is, however, the more common practice to provide a free-running clock generator in the receiver to develop the synchronizing or clock pulses.

It is often difficult in the conventional binary data receiver to synchronize the free-running clock pulses developed in the receiver to the incoming data pulses, particularly when, as is common, there is jitter or noise in the incoming data pulses. The conventional data receiver has the further disadvantages in that the free-running clocks often consume a relatively large amount of power, and the frequency of the clock pulses, which should be precisely and accurately established, may vary with variations in power voltage and/or temperature.

In some binary data receivers, such as the one disclosed in U.S. Pat. No. 4,061,975 to Sugai, the binary data, rather than being transmitted in the form of the presence or absence of a pulse, is represented by the relative widths of the data pulses. For example, in a system of this type, a pulse having a width T would represent a logic "0" whereas a pulse having a width 2T would represent a logic "1". These so-called pulse-width data transmission systems, however, generally are also often adversely affected by variations in supply voltage and temperature, and also require high accuracy in the widths of the data pulses. In addition, these known data communication systems require synchronization between the data and clock pulses, which, in turn, require additional synchronizing circuitry.

It is accordingly an object of the invention to provide a binary data receiver in which the clock signal is derived from the incoming data signal so that there is no need to provide synchronization between the data and clock signals.

It is a further object of the invention to provide a binary data receiver in which the synchronization achieved between data and clock pulses is unaffected by jitter or noise in the incoming data pulses.

It is another object of the present invention to provide a binary data receiver which consumes less power during operation and which operates reliably independent of any variations in supply voltage or temperature.

It is yet a further object of the invention to provide a self-clocking binary data receiver in which an accurate source of a clock signal is not required and in which the receiver operation is immune to noise in the incoming data signal.

It is a general object of the invention to provide a self-clocking binary data receiver having improved operating characteristics.

To these ends, the present invention provides a binary data receiver to which is supplied an input signal in which the logic "0" and "1" levels are represented by pulses of different pulse-widths. The incoming data signals of differing pulsewidths are integrated to provide signals of correspondingly different voltage levels. The integrated signal is applied to a voltage divider, and clock- and data-generating gates connected to different nodes of the voltage divider are respectively operatable in response to the first and second voltage levels, thereby to produce a clock pulse for every data input pulse and a data one pulse for each input data pulse having a specified one of the two pulsewidths. In this manner the data one and clock pulses are inherently in synchronization, or self-synchronized, in a manner that is substantially independent of variations in temperature and power supply voltage.

To the accomplishment of the above and such other objects as may hereinafter appear, the present invention is directed to a self-clocking binary data receiver substantially as defined in the appended claims and as described in the following detailed specification, as considered with the accompanying drawings in which:

Figure 2:
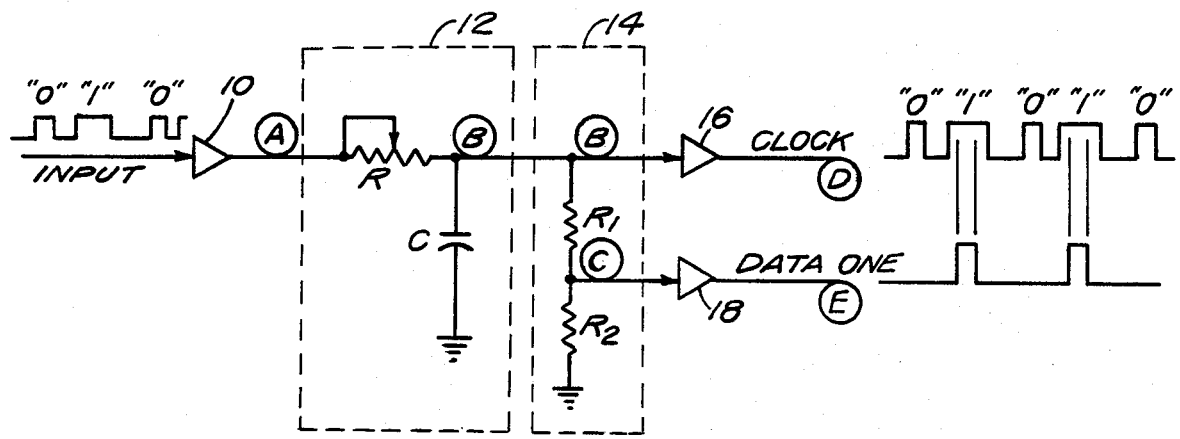
FIG. 2 is a schematic diagram of a portion of the data receiver of the present invention.

FIGS. 4a–c and FIGS. 5a and b are signal waveforms for use in describing the operation of the circuit of FIG. 2; and FIGS. 6a–g are schematic representations generally illustrating waveforms at various points in the inventive system.

Figure 1:
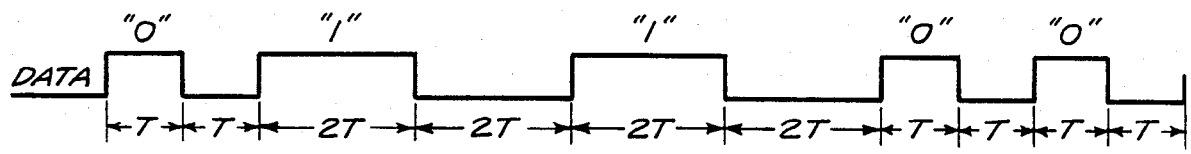
FIG. 1 is a waveform of an input data signal in which pulsewidth is used to represent binary data as employed in the data receiver of the present invention.

The self-clocking data receiver of the invention receives and processes data input signals in which the pulsewidths of the input pulses represent the two binary logic "1" and "0" levels, rather than the presence or absence of a pulse. An example of a data input signal in which pulsewidth is used to represent binary logic is provided in FIG. 1, in which a logic "0" is represented by a signal having a pulsewidth of T and a logic "1" is represented by a signal having a pulsewidth of 2T. It will be understood that the 2:1 ratio of the pulsewidths of the logic "1" and "0" signals shown in FIG. 1 is exemplary only, and that the data receiver of the invention as hereinafter described is also operable to receive and process signals having other pulsewidth ratios to represent the binary states. It will also be noted in FIG. 1 that the period between a logic "0" and the following data signal is T, irrespective of the pulsewidth of the succeeding data signal, and that the period between a logic "1" signal and the succeeding data signal is 2T, again irrespective of the logic level or pulsewidth of the succeeding data signal. This arrangement is also shown for exemplary purposes and also is not intended to limit the applicability or scope of the invention.

The self-clocking data receiver of the invention, which receives a data input of the type illustrated in FIG. 1, is illustrated in FIG. 2. As therein shown, the data input is applied to an input CMOS buffer gate 10 having an output node A. The output of buffer 10 is applied to the input of an integration circuit 12, which may, as shown, consist of a variable resistor R connected to one plate of a capacitor C at a node B. The other plate of capacitor C is connected to ground.

The output of the integration circuit 12 at node B is connected to a resistor ladder circuit or voltage divider 14, which includes a pair of resistors R1 and R2 connected at a node C. The other end of resistor R1 is connected to node B, and the other end of resistor R2 is connected to ground. Nodes B and C are respectively connected to the inputs of CMOS buffer gates 16 and 18, which, in turn, produce at their outputs at nodes D and E, respectively, the synchronized clock and data one signals in a manner described in greater detail in a later part of this specification. The clock and data one signals are applied to a data-collection circuit shown in FIG. 3.

Figure 3:
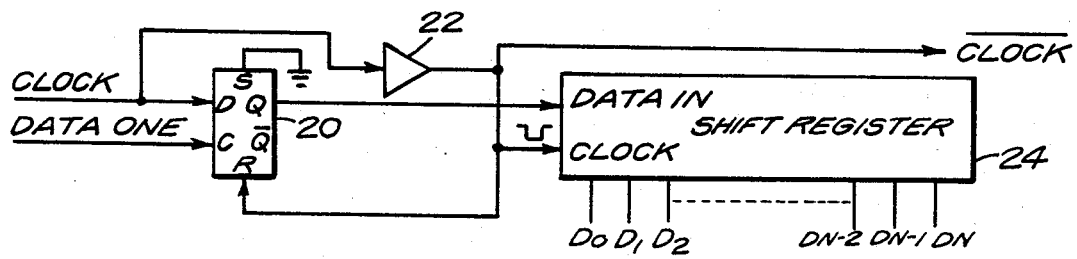
FIG. 3 is a schematic diagram of the data-collection stage of the data receiver of the invention.
Figure 6A:
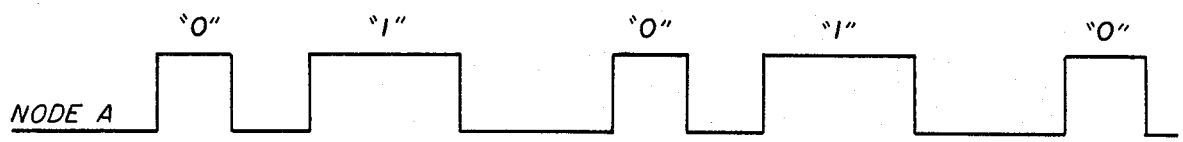
Figure 6B:
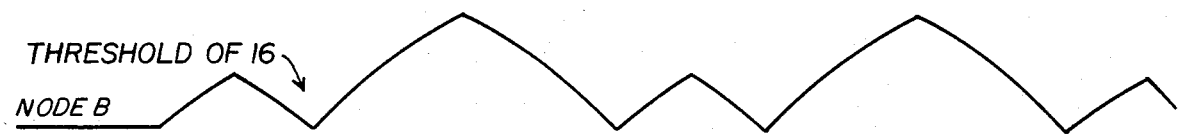
Figure 6C:
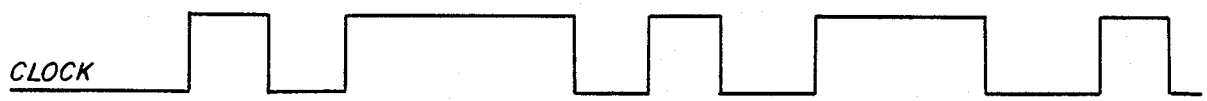
Figure 6D:
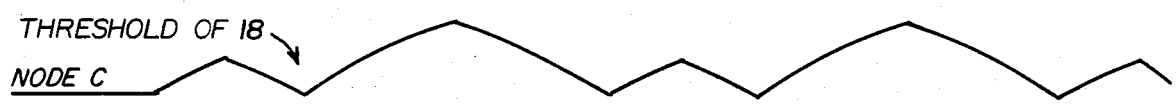
Figure 6E:
Figure 6F:
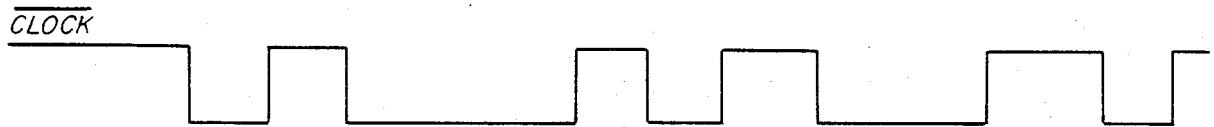
Figure 6G:

As shown in FIG. 3, the clock signals at node D are applied to the D terminal of a D-type flip-flop 20 and to the input of an inverter 22. The inverted clock output of inverter 22 is applied to the clock input of an N-stage shift register 24, which stores bits $D_o, D_1 \ldots D_n$, and to the reset terminal of flip-flop 20. The data one signal at node E is applied to the C terminal of the flip-flop 20, and the Q terminal of the flip-flop is connected to the data in terminal of shift register 24.

The operation of the circuit of FIG. 2 can be understood from the waveforms of FIGS. 4, 5 and 6. Assuming a supply voltage of a level $V_o$ applied to CMOS gate buffer 10, as well as at CMOS buffers 16 and 18, the signal at node A (FIG. 6a) applied to the integration circuit is a pulse having an amplitude $V_o$ and a pulsewidth of either T (logic "0") or 2T (logic "1"). A clock pulse is produced at node D (FIG. 6c) in response to either a logic "1" or logic "0" applied at node A, whereas a data one signal is produced at node E (FIG. 6e) only when a logic "1" or a signal at a pulse width of 2T is applied at input node A.

Referring to FIG. 4a, when a square wave is applied to the integration circuit 12, the voltage $V_o$ at node B can be computed by:

At time $T$: $V_1 = V_o(1 - e^{-T/RC})$

At time $2T$: $V_2 = V_o(1 - e^{-2T/RC})$

Thus: $\dfrac{V_2}{V_1} = \dfrac{V_o(1 - e^{-2T/RC})}{V_o(1 - e^{-T/RC})} = 1 + e^{-T/RC}$ With fixed values for T, R, and C, the ratio $(V_2/V_1)$ is thus a constant and is independent of the supply voltage $V_o$. In the embodiment of the invention herein described, the switching point of the CMOS gates 16 and 18 between the "on" and "off", or "0" and "1", states is set to be one-half the supply voltage $V_o$ and, as shown in FIG. 4(a), for either a data "0" or data "1" pulsewidth (T or 2T) the voltage at node B will rise to a value of $\frac{1}{2}V_o$ at a time $\Delta T_o$. At this level, gate 16 is turned on and a clock pulse is produced at node D. The resistance value of resistor R in integration circuit 12 can be adjusted such that the integrated voltage of node B exceeds $\frac{1}{2}V_o$ for an input pulse of either pulsewidth T to T2, whereby a clock output at node D is produced whenever a "0" or a "1" is presented at node A, as shown in FIGS. 4b and 4e, respectively.

The pulsewidth of the clock output at node D is, however, different for a data "0" and a data "1" and can be calculated as follows:

For a data "0" signal, charging to $\frac{1}{2}V_o$:

$$\tfrac{1}{2}V_o = V_o(1 - e^{-\Delta T_o/RC})e^{-\Delta T_o/RC} = \tfrac{1}{2}$$

Thus, $\Delta T_o = RC\,Ln2$.

For data "0", discharging from $V_1$ to $\frac{1}{2}V_o$:

$$V_1 e^{-\Delta T_2/RC} = V_o e^{-\Delta T_2/RC}(1 - e^{-T/RC}) = \tfrac{1}{2}V_o$$

$$e^{\Delta T_2/RC} = 2(1 - e^{-T/RC})$$

Thus, $T_2 = RC Ln2(1 - e^{-T/RC})$

Therefore, the pulsewidth for a clock pulse produced for an input data "0" is, with reference to FIG. 4(b):

$$T_{zero} = \Delta T1 + \Delta T_2 = T - \Delta T_o + \Delta T_2$$
$$= T - RCLn2 + RCLn2(1 - e^{-T/RC})$$
$$= T + RCLn(1 - e^{-T/RC})$$

Similarly, to compute the pulsewidth of a clock developed at node D in response to an input data "1" (FIG. 4(c)), to discharge from $V_2$ to $\frac{1}{2}V_o$ $$V_2 e^{-\Delta T_3 RC} = \tfrac{1}{2}V_o$$

$$V_o(1 - e^{-2T/RC})e^{-\Delta T_3 RC} = \tfrac{1}{2}V_o$$

$$e^{T_3/RC} = 2(1 - e^{-2T/RC})$$

$$\Delta T_3 = RCLn\,2(1 - e^{-2T/RC})$$

Thus, $\Delta T_{one}$, the clock pulsewidth produced in response to a data "1" input, is:

$$T_{one} = 2T - \Delta T_o + \Delta T_3$$
$$= 2T - RCLn2 + RC2(1 - e^{-2T/RC})$$
$$= 2T + RCLn(1 - e^{-2T/RC})$$

The pulsewidth of the clock outputs at node D produced for either a "0" or "1" input is thus independent of the supply voltage, such that any variation in the supply voltage will not affect the performance of the receiver.

As noted previously, the integrated data signal at node B is also used to generate the data one signals in response to each input logic "1" data signal; that is, as shown in FIG. 1, all input signals having a pulse width of 2T. To this end, the ratio of resistors R1 and R2 in voltage divider 14 is selected such that the voltage at node C peaks at a level of $\frac{1}{2}V_o$ (the CMOS gate switching level) when the voltage at node B peaks at voltage $V_1$. In this case only a data "1" signal is able to pass through the data one CMOS gate 18 to develop a data one signal (FIG. 6(e)) at node E.

With reference to FIGS. 5a and b, the ratio $(R_1/R_2)$ necessary to achieve the desired voltage $\frac{1}{2}V_o$ at node C to develop a data one signal from each input logic "1" pulse of a pulsewidth 2T, can be calculated as follows:

$$V_1 \times \dfrac{R_2}{R_1 + R_2} = \tfrac{1}{2}V_o$$

$$V_o(1 - e^{-T/RC})\dfrac{R_2}{R_1 + R_2} = \tfrac{1}{2}V_o$$

-continued
$$\frac{R_2}{R_1 + R_2} = \frac{1}{2(1 - e^{-T/RC})}$$

$$\frac{R_1 + R_2}{R_2} = 2(1 - e^{-T/RC}) = 1 + \frac{R_1}{R_2}$$

$$\text{Thus } \frac{R_1}{R_2} = 1 - 2e^{-T/RC}$$

The voltage $V_2$ at node C can be calculated as follows:

$$V_2' = V_2 \times \frac{R_2}{R_1 + R_2} = V_o(1 - e^{-2T/RC}) \times \frac{1}{2(1 - e^{-T/RC})}$$

The pulsewidth of a data one signal produced at the output of CMOS buffer gate 18, when the voltage at node C reaches $\frac{1}{2}V_o$, the switching voltage of gate 18, can be calculated as follows, with reference to FIG. 5b:
To discharge from $V_2'$ to $\frac{1}{2}V_o$ $$V_2' e^{-\Delta T_4/RC} = \frac{1}{2}V_o$$

$$\frac{V_o}{2}(1 + e^{-T/RC})e^{-\Delta T_4/RC} = \frac{1}{2}V_o$$

$$e^{\Delta T_4/RC} = 1 + e^{-T/RC}$$

$$\Delta T_4 = RC Ln(1 + e^{-T/RC})$$

Thus, $\Delta T_{data\ one} = T + \Delta T_4$ $$= T + RC Ln(1 + e^{-T/RC})$$

It will be noted that the pulsewidth of the data one pulse is also independent of the supply voltage.

Resistors R1 and R2 of the resistive voltage divider 14 have values of resistance that are an order of magnitude greater than that of the resistor R of integration circuit 12, so that resistors R1 and R2 do not affect the charging and discharging of the integration circuit capacitor C. CMOS gates and buffers 10, 16, and 18 have very high input impedances on the charging and discharging of the integration circuit capacitor C. Moreover, the high resistance values of resistors R1 and R2 result in a reduction in the power dissipation in the circuit.

The temperature variation of the voltage ratio $(V_2/V_1)$, that is the ratio of the integrated voltages at node B for input pulses having pulsewidths of 2T and T, respectively, can be computed as follows:

$$\frac{d}{dR}\left(\frac{V_1}{V_2}\right) = \frac{d}{dR}(1 + e^{-T/RC})$$

$$= (e^{-T/RC})\left(\frac{-T}{C}\right)\left(\frac{-1}{R^2}\right)$$

$$= \frac{\frac{T}{C}e^{-T/RC}}{R^2}$$

$$\Delta\left(\frac{V_2}{V_1}\right) = \left(\frac{\frac{T}{C}e^{-T/RC}}{R^2}\right)\Delta R$$

Since $\Delta(V_2/V_1)$ is inversely proportional to the square of the integration circuit resistor R, the effect of temperature variation on the operation of the receiver of the invention is reduced by two orders of magnitude. Moreover, since a relatively large amount of energy is needed to charge the integration circuit capacitor C, substantially all the noise spikes in the receiver are filtered out.

As noted, the self-synchronized data one and clock pulses produced at the outputs of gates 18 and 16, respectively, are collected in the circuit of FIG. 3. Since the data one pulse at node E (FIG. 6e) is narrower than the clock pulse at node D produced in response to a data "1" (FIG. 6c), D-type flip-flop 20 is used to resolve the race condition of data input. At the leading edge of a data one signal, a data "1" clock pulse is loaded into the flip-flop 20. When a data "1" clock is presented, it stays in flip-flop 20 until a data one pulse is strobed into shift register 24 at the trailing edge of the clock. The inactive state of the clock clears the flip-flop 20 and the flip-flop stays cleared if no data one is presented at its input. Thus, zero is strobed into shift register 24 on the trailing edge of the clock pulse if a data "0" clock pulse is presented at the input of flip-flop 20.

Since the clock information is derived from the input data source, no synchronization is needed in the data receiver of the invention, which can thus receive the process data reliably under serious jitter conditions. Expensive stabilization circuits commonly used in binary data communication transmitters, computers, and radar systems, and in the servo speed control circuits used to drive magnetic discs and tapes and in radar systems thus become unnecessary. The data receiver system of the invention operates more reliably than the conventional data-clock synchronized receiver systems.

It will be understood that whereas the present invention has been described hereinabove with respect to a single preferred embodiment, modifications may become apparent and made to the embodiment disclosed without necessarily departing from the spirit and scope of the invention.

What is claimed is:

1. In a data receiver for receiving input binary data in which 1 and 0 logic levels are represented by signals having first and second different pulsewidths, respectively, said receiver comprising means responsive to the received input binary data for integrating the same and for producing corresponding signals of first and second levels, means coupled to said integrating means for establishing from said integrated signals clock-control signals at a first node and data-control signals at a second node, and first and second switching means respectively connected to said first and second nodes for respectively producing at their outputs a clock signal for each input data signal and a data signal for each input data signal at only one of said first and said second pulsewidths.

2. The data receiver of claim 1, in which said signal establishing means comprises a voltage divider including said first and second nodes, said data-control signals at said second node being a predetermined ratio of said clock-control signals at said first node.

3. The data receiver of claim 2, further comprising a flip-flop having first and second inputs connected respectively to the outputs of said first and second switching means, and a shift register having a data input connected to the output of said flip-flop and a clock input operatively connected to the output of said second switching means.

4. In a data receiver for receiving input binary data in which 1 and 0 logic levels are represented by signals having first and second different pulsewidths, respectively, said receiver comprising means for integrating the received input binary data and for producing corresponding signals of first and second voltage levels, means coupled to said integrating means for establishing from said integrated signals clock control signals at a first node and reduced voltage level data control signals at a second node, and first and second switching means respectively connected to said first and second nodes, said first and second switching means having predetermined threshold levels, thereby acting as gates such that said data control signals corresponding to one of said pulsewidths is sufficiently high to activate said second switching means inducing an output from said switching means, whereas the voltage level of said data control signal established at said second node in corresponding to one of the other of said pulsewidths is less than that required to activate said second switching means.

5. The data receiver of claim 4, in which the voltage level of the clock-control signal established at said first node in response to an input data signal of either of said first and second pulsewidths is sufficient to activate said first switching means which act as a gate, thereby to produce a clock signal at the output of said first switching means.

6. The data receiver of claim 4, in which said signal establishing means comprises a voltage divider including said first and second nodes, said data-control signals at said second node being a predetermined ratio of said clock control signal at said first node.

7. In a receiver for receiving binary data in which incoming signals have a first pulsewidth indicative of one logic state and a second pulsewidth indicative of a second logic state, self clocking circuitry for producing distinct clock and data signals from said incoming data comprising:

(a) input means for introducing said incoming data to said circuitry;
(b) integrator means electrically coupled to said input means and directly responsive to said incoming data for generating integrated signals corresponding to signals included in said incoming data, said integrated signals being characterized by a first pulse height characteristic of one logic state and a second pulse height characteristic of a second logic state, said pulse heights and said integrated signals respectively corresponding to the pulsewidth of said incoming signals;
(c) means for attenuating said integrated signals electrically coupled to an output of said integrator means, said attenuated integrated signals corresponding to said integrated signals and having a lower pulse height;
(d) first gate means directly electrically coupled to an output of said integrator means for producing a clock signal corresponding to each of said integrated signals, which in turn, correspond to the pulsewidths of said incoming signals and;
(e) second gate means electrically coupled to said attenuating means having an excitation threshold higher than the pulse height of some of said attenuated integrated signals, whereby a data signal is selectively produced at the output of said second gate means, and some of said incoming signals cause no output from said second gate means.

8. The data receiver of claim 7, wherein said integrator means comprise an R-C circuit, and said attenuating means comprise a resistor ladder type of circuitry.

9. The data receiver of claim 7, wherein said first and said second gate means comprise CMOS buffers.

10. The data receiver of claim 7, further comprising a flip-flop having first and second inputs respectively connected to outputs of said first and second gate means, and a shift register having data input connected to the output of said flip-flop and a clock input connected to the output of said second switching means.

* * * * *